Nov. 1, 1960 A. C. DICKIESON 2,958,733

TRANSMISSION CONTROL IN A TWO WAY COMMUNICATION SYSTEM

Filed Dec. 23, 1958 3 Sheets-Sheet 1

INVENTOR
A. C. DICKIESON
BY Harry C. Hart
ATTORNEY

INVENTOR
A. C. DICKIESON
BY Harry C. Hart
ATTORNEY

Nov. 1, 1960 A. C. DICKIESON 2,958,733

TRANSMISSION CONTROL IN A TWO WAY COMMUNICATION SYSTEM

Filed Dec. 23, 1958 3 Sheets-Sheet 3

INVENTOR
A. C. DICKIESON
BY Harry C. Hart
ATTORNEY 2,958,733
Patented Nov. 1, 1960

1

2,958,733

TRANSMISSION CONTROL IN A TWO WAY COMMUNICATION SYSTEM

Alton C. Dickieson, Mountain Lakes, N.J., assignor to Bell Telephone Laboratories, Incorporated, New York, N.Y., a corporation of New York Filed Dec. 23, 1958, Ser. No. 782,550

14 Claims. (Cl. 179—15)

This invention deals with voice communication systems and, more particularly, with systems in which significant parts of the speech signals of a plurality of talkers are interleaved and transmitted on a lesser plurality of communication channels.

The most efficient use of transmission facilities occurs when full use of all of the available channel time is made. One means of making the maximum use of channel time is to employ a time assignment speech interpolation system, commonly known as TASI. Such systems are well known in the art, being disclosed, for example, in the patent application of F. A. Saal and I. Welber, Serial No. 686,468, filed September 26, 1957.

A telephone conversation uses transmission facilities in one direction, on the average, for less than one-third of the time. TASI turns this statistical fact to account by providing a talker with a channel only during those periods when the talker is generating speech energy above some preselected level.

For the purpose of TASI, speech may be considered as a series of talkspurts, a talkspurt being an elementary unit of speech, during which speech energy is present continuously. In a TASI system each signal source or talker's station is monitored by a speech detector which generates an output signal in response to the talkspurts of its associated talker whenever the speech energy exceeds some preselected level. The input to each detector is a speech wave, suitably amplified, and the output is a train of direct-current pulses representing talkspurts. Each output pulse corresponds to an increment of time during which the magnitude or volume of the talkspurt is sufficient to overcome the designed sensitivity threshold of the detector. The output signals from each of the detectors in a system are applied to control apparatus which in turn transmits operating signals to a TASI switch. The switch operates in response to such signals to connect the active talkers with idle channels.

While early TASI systems were relatively crude, efficiency has been increased by improvements in both switching techniques and in the logic circuitry of the control apparatus. However, a still greater potential for increased efficiency lies in the solution of certain problems dealing with the operation of TASI speech detectors. The most critical of these problems is that a speech detector is active, that is to say output signals are generated, during certain periods when a transmission line is not in fact required. For example, a detector is subject to false operation by both noise and echoes. Additionally, relatively loud talkers activate a speech detector more frequently than is necessary for the transmission of speech of acceptable quality. The undue activity contributed by relatively loud talkers may be reduced by reducing the sensitivity of the detector. However, such action, while solving one problem, merely creates another of equal magnitude since a speech detector with a reduced sensitivity may remain inactive despite a significant talkspurt from a relatively weak talker. On the other hand, while the needs of a relatively weak talker may be met by a relatively sensitive speech detector, a constant high level of sensitivity leads not only to the excess operation of the detector by strong talkers, as noted above, but also invites false operation of the detector by low level noise and echoes. If some compromise level of speech detector sensitivity is selected, there is a corresponding compromise in both the quality of the transmitted speech and in the efficiency of the system. The result of these problems is that TASI systems known in the art are unable to make full and efficient use of their assigned communication channels.

2

Accordingly, one object of this invention is to improve the efficiency of voice communication systems.

A more specific object of this invention is to provide communication channel-sharing apparatus that is equally responsive to the needs of both relatively weak and relatively strong talkers.

A further object of this invention is to reduce the false operation of speech detectors by noise and echoes.

These and other objects of the invention are achieved by a speech detector which operates at a low sensitivity in response to speech signals from a relatively loud talker and which shifts to a high sensitivity in response to speech signals from a relatively weak talker. The shift in speech detector sensitivity is effected by circuitry that is responsive to any speech signal lying within a preselected relatively weak volume range. Additionally, a speech detector, in accordance with the invention, is automatically set at a relatively low level of sensitivity in the absence of speech signals on the associated talker's line. Further, since conventional echo suppressor operation is ineffective to protect speech detectors from false operation by echoes, the invention provides apparatus which sets a speech detector at a low level of sensitivity in response to speech echoes.

More specifically, in accordance with a particular embodiment of the invention, each speech detector in a TASI system is provided with a loss-pad between its input point and its associated talker's line. A low-loss shunt path around the loss-pad includes a control device which opens or closes the shunt circuit in response to certain applied operating signals.

In a conventional TASI arrangement, two paths are provided for the outgoing speech signals from each talker; one path applies the signal to the speech detector and the second through the TASI switch to an outgoing channel. In accordance with the invention, a third speech path is provided which, in a particular embodiment, includes a pair of limiter-detector circuits in parallel configuration. The limiter-detector circuits are so designed that any input speech signal falling within a preselected range of amplitude levels is reflected by an imbalance between the two limiter-detector outputs. A combining circuit translates any such imbalance into an output signal which is applied to the control device. The resulting operation of the control device increases the sensitivity of the speech detector by closing the shunt path around the speech detector loss-pad. The sensitivity range of the limiter-rectifiers is designed to correspond to the signal amplitude range of relatively weak talkers and thus, in accordance with the invention, the sensitivity of the speech detector is automatically increased to accommodate relatively weak speech signals whenever they occur.

In the event of a shift from weak speech signals to strongspeech signals on a particular line the respective outputs from the pair of limiter-rectifier combinations are balanced, no signal is applied to the control device from the combining circuit and consequently the control device returns to its normal or quiescent condition, thereby opening the shunt path around the loss-pad. Thus, in accordance with the invention, the sensitivity of the speech detector is automatically shifted to a relatively low level to accommodate relatively strong speech signals whenever they occur.

In accordance with another aspect of the invention, as noted above, the sensitivity of a speech detector is shifted to a relatively low level in response to speech echoes. This aspect of the invention is cooperatively related to the circuitry employed to shift speech detector sensitivity by a shift in talker volume. Specifically, a second speech detector is connected between the receiving line and the control device. Echoes of transmitted speech signals or received speech signals on the receiving line which are above a preselected volume operate the second speech detector in conventional fashion and the output of the second speech detector is then employed to operate the control device so as to open the first detector loss-pad by-pass circuit, thus ensuring relatively low sensitivity for the first or primary speech detector during the presence of echoes.

Accordingly, one feature of the invention is an arrangement which provides a speech detector with reduced sensitivity in the absence of speech, maximum sensitivity for weak speech, and reduced sensitivity for loud speech.

Another feature of the invention is a particular combination of circuits which affords protection against false operation of a speech detector by echoes and which also controls the sensitivity of that speech detector in accordance with the amplitude of incoming speech signals.

The invention, together with additional objects and features thereof, will be fully apprehended from a consideration of the following detailed description and accompanying drawings of a particular embodiment, in which.

Figure 3:
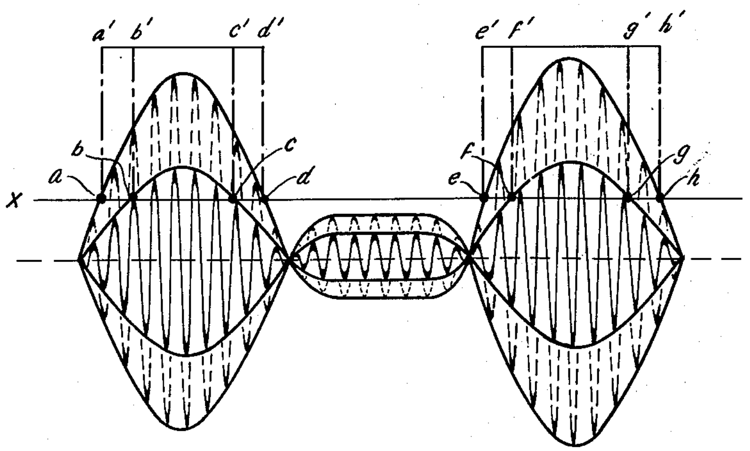
Fig. 3 is a pair of unlike amplitude wave forms of a speech spurt with an indication of corresponding speech detector activity.

A preliminary discussion of the curves shown in Figs. 3 and 4, before considering a specific embodiment, will facilitate an understanding of the fundamentals of speech detector operation and of the principles of the invention. In Fig. 3 the curve *a—d—e—h* is an idealized wave form of the envelope of a speech spurt. The curve *b—c—f—g* is the wave form of a speech envelope representing the same speech spurt at a lesser amplitude. The line *x* is the threshold or sensitivity of a particular speech detector to which the two speech waves shown are applied and, accordingly, points *a* through *h* illustrate the points at which the speech detector is activated and deactivated. Thus, the length of the line *a'd'* represents the speech detector activation period resulting from the positive peak of the wave *a—d* which lies above the threshold *x*. The line segment *b'c'* shows the speech detector activation period which corresponds to the positive peak *bc* of the lesser amplitude signal. In the same fashion, *e'h'* and *f'g'* are proportional to the speech detection activation periods for the second positive envelope peaks of the larger and smaller amplitude signals, respectively. Since speech detector output is a series of direct-current pulses which correspond to the envelope peaks of applied speech signals, Fig. 3 also serves to illustrate the wave form of the speech detector output. For example, the output pulse corresponding to the peak *a—d* is shown as *aa'd'd*, and for the peak *b—c* the output pulse is

*bb'c'c*. Evidently, then, the activation of a speech detector at a fixed sensitivity level is greater for the speech signal of a particular amplitude than for the same speech signal at a lesser amplitude.

Assuming that the activation periods shown in Fig. 3 for both the greater and the lesser amplitude signals are sufficient to ensure the transmission of speech of adequate quality, it is apparent that the speech detector has been activated for periods longer than necessary during the positive peaks of the larger amplitude signal. In a TASI system, unnecessary activity of a speech detector necessarily results in the assignment of a communication channel to a talker during periods when a channel is not required. Thus, in Fig. 3, line segments *a'b'*, *c'd'*, *e'f'*, and *g'h'* represent wasted channel time.

Figure 4B:
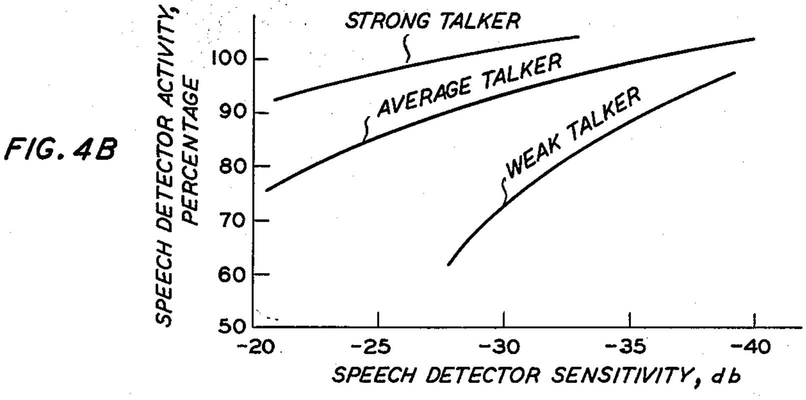
Fig. 4B is a plot of speech detector sensitivity versus speech detector activity.
Figure 4A:
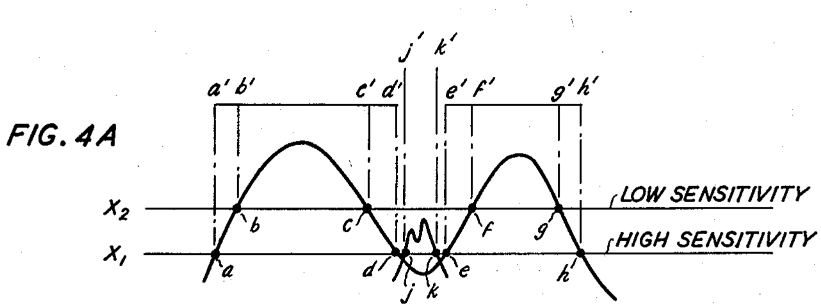
Fig. 4A is a wave form of a speech spurt together with an indication of the change in speech detector activity associated with a change in speech detector sensitivity.

Turning now to Fig. 4A, a single curve representing the positive portions of the envelope of a speech spurt of a particular amplitude is defined by points *a* through *h*. The lines $x_1$ and $x_2$ represent sensitivity levels for a speech detector to which the illustrated speech signal is applied, $x_1$ being of a higher sensitivity than $x_2$. As in Fig. 3, the activation periods of the speech detector resulting from the speech wave are shown by the distances between points at which the speech wave intersects the particular sensitivity level. Since two sensitivity levels are shown, Fig. 4A also serves to illustrate the relationship between speech detector activity and sensitivity. For example, the ratio of speech detector activity at sensitivity $x_2$ to the activity of sensitivity $x_1$ for the talkspurts shown is the ratio of the lengths $b'c'+f'g'$ to $a'd'+e'h'$. If sensitivity $x_2$ is sufficient to activate the speech detector for periods adequate to ensure the assignment of a transmission signal whenever significant parts of a speech spurt occur, it is evident that at sensitivity $x_1$ wasted speech detector activity and accompanying wasted channel time are represented by the lengths of the line segments $a'b'+c'd'+e'f'+e'h'$.

Fig. 4A illustrates an additional effect of a change in speech detector sensitivity. The curve *jk* represents an interfering signal which might result, for example, from noise or crosstalk. If the sensitivity of the speech detector is at $x_1$, the noise will be reflected by wasted speech detector activity during the time represented by the length *j'k'*. However, if speech detector sensitivity is set at level $x_2$, which may be done in accordance with the invention during periods of relatively strong talk spurts, a noise such as that shown by the wave form *jk* would be of insufficient amplitude to operate the speech detector and a gain in overall efficiency would result.

The principles discussed in connection with Fig. 3 and Fig. 4A are illustrated further by the curve of Fig. 4B. From the typical curves established by plotting speech detector sensitivity against percentage of speech detector activity for three talkers, each at a different volume level, it is evident that for a particular talker, the percentage of speech detector activity increases with speech detector sensitivity. It is also apparent that at a particular speech detector sensitivity, the percentage of speech detector activity increases with the strength of the talker.

Figure 1:
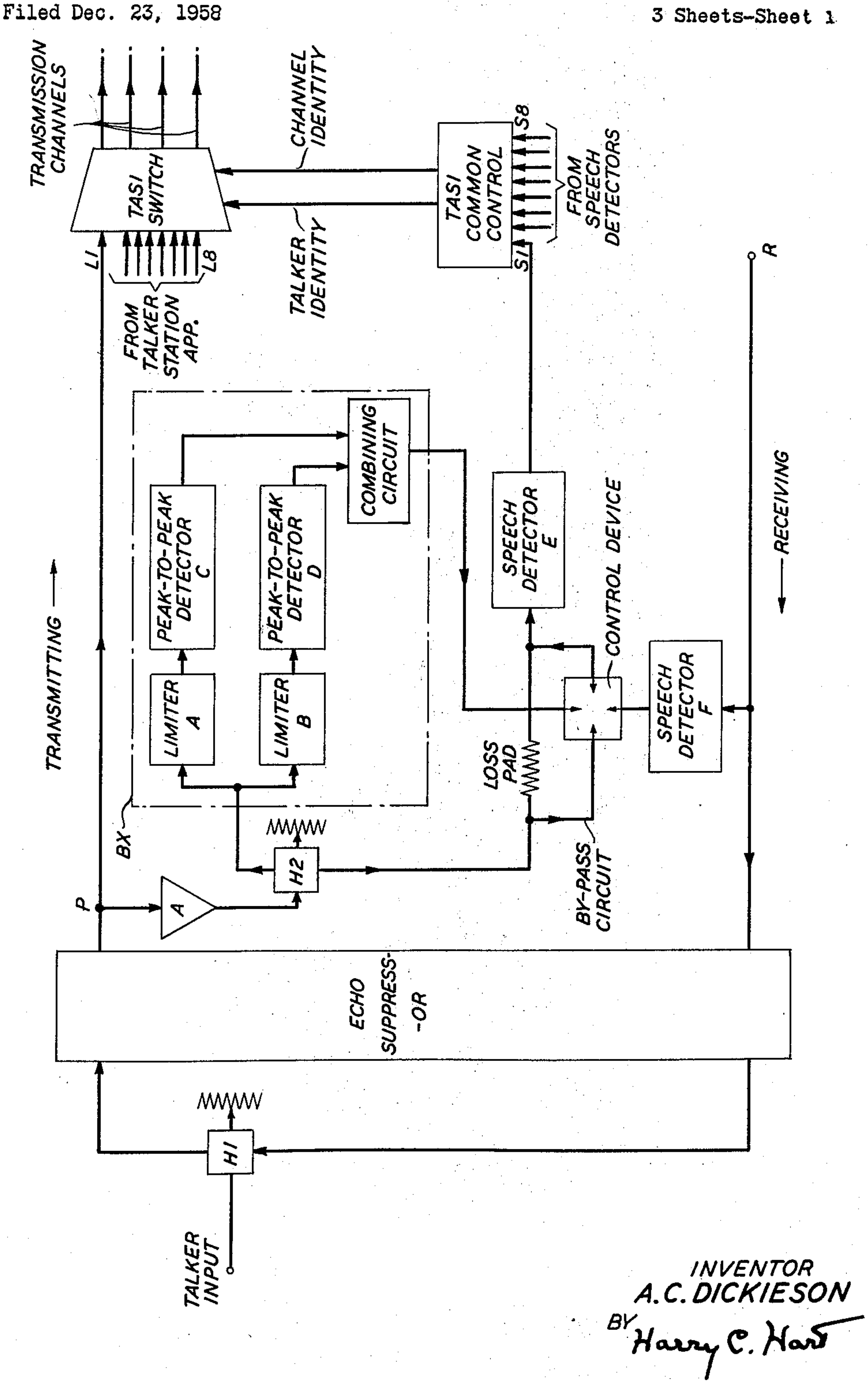
Fig. 1 is a block diagram of a part of a TASI system in accordance with the invention.

Turning now to a particular embodiment of the invention, Fig. 1 shows the features of the invention in block diagram form as a part of a TASI communication system. The operation of the circuit may be demonstrated conveniently by tracing the course of an input speech signal. Commencing at the talker input point, the signal is applied to the hybrid circuit $H_1$, which may be of conventional form. The signal is then fed to the transmitting line through an echo suppressor. Echo suppressors are well known in the art and function to insert a relatively high impedance between a talker and his receiving line at a preselected time after the talker begins transmitting so that speech energy which might be reflected in the form of echoes from the far end is blocked before reaching the hybrid circuit.

Similarly, speech signals on the receiving line which exceed a particular level operate the echo suppressor so that after a suitable time interval a high impedance is inserted between the near end talker and his transmitting line. Such devices are shown, for example, in Patent 1,545,558 to H. S. Hamilton and S. B. Wright, July 14, 1925.

For the purpose of the present discussion, a low impedance path between the hybrid circuit and the transmitting line may be assumed. Alternate paths for the signal are provided at point P; the first path terminates at the TASI switch and the second path applies the signal to a suitable amplifier. Considering the latter path first, the output of the amplifier is fed to a second conventional hybrid circuit $H_2$ which in turn has a pair of output paths. Following the upper output of hybrid $H_2$, the speech signal is applied to parallel paths including limiter A and limiter B, respectively. Limiter A clips the positive and negative peaks of input signals which exceed a preselected voltage level, for example, one-half volt. The clipping level may also be described in terms of signal strength above a particular reference level. Hence, the one-half volt level might correspond to a signal strength of −30 db. Limiter B acts in a similar fashion but is designed with a different clipping level than limiter A. For example, the clipping level of limiter B might be selected at −20 db. In accordance with the invention, the clipping levels of the two limiters are selected so as to bracket the signals contributed by relatively weak talkers. Weak talkers may be defined as those who represent some fixed percentage of all talkers, for example, the weakest fifteen percent. A weak talker may also be defined as one who contributes speech signals which, on an average lie within a designated amplitude range. For purposes of illustration, we may define this range as that marked by the −20 db to −30 db clipping levels of the limiters. The clipped or unclipped signal output from limiter A is applied to a peak-to-peak detector C which produces a direct-current output of a single preselected magnitude in response to any clipped input signal. Peak-to-peak detector D performs a similar function on the output of limiter B.

In the case of an input signal which exceeds the clipping level of the less sensitive limiter, the outputs of peak-to-peak detector C and peak-to-peak detector D are equal. These outputs are applied to a combining circuit which in effect subtracts the two signals and hence a relatively strong input to the limiters produces no output from the combining circuit. The output path from the combining circuit terminates in a control device. The control device which may be a relay, for example, is responsive to signals from the combining circuit, and operation of the device closes a by-path path around the loss-pad at the input to speech detector E. Accordingly, it is apparent that in the case of speech signals from relatively strong talkers the outputs of the peak-to-peak detectors C and D are equal, the output from the combining circuit is zero, the control device remains unoperated, and the loss-pad by-pass circuit remains open.

Returning now to the hybrid circuit $H_2$, the lower output path from the hybrid terminates at the speech detector E through the loss-pad, or through the by-pass circuit if the control device has operated to close that circuit. In the case of the strong talker signal being considered, however, the control device remains unoperated and hence the signal can be applied to speech detector E only through the loss-pad. For the purpose of illustration, we may assume a speech detector sensitivity of −41 db and a loss-pad attenuation of 10 db. Further, if the output from hybrid $H_2$ is the result of a relatively strong talk signal, for example a signal of −15 db, the signal is reduced by the loss-pad to a level of −25 db which is still well above the sensitivity of the speech detector. This situation may be more clearly understood in terms of the change in the effective sensitivity of the speech detector that is contributed by the loss-pad. For example, with the loss-pad in the circuit, a noise peak which might occur at the −35 db level faces a speech detector with an effective sensitivity of only −31 db and hence, false operation of the detector is prevented.

Consider now the action of the circuit in response to a speech signal of such a level that the signal is clipped by the more sensitive limiter A but is passed unclipped by the less sensitive limiter B. Assuming again that limiter A clips signals above the −30 db level and that limiter B clips signals above the −20 db level, an incoming signal at an intermediate level, for example, −25 db is clipped by limiter A only and the output of peak-to-peak detector C, being at a maximum, necessarily exceeds the output of peak-to-peak detector D. The combining circuit reflects the difference between these two outputs by an output signal which is applied to the control device or relay. The control device, operating in response to the signal from the combining circuit, closes the low impedance by-pass around the loss-pad and thus, in effect, speech detector E retains its level of sensitivity at the −41 db level.

It is apparent that in the quiescent state, that is when no signals are on the line, the control device is in the same condition as it is during the speech spurts of relatively loud talkers. Thus, in accordance with the invention, the sensitivity of speech detector E is at a reduced level when signals from relatively strong talkers are applied, is at an increased level when a weak talker is on the line and is again at a reduced level in the absence of speech signals. Consequently, in accordance with the invention, speech detector activity is held to a minimum amount required for the transmission of speech of acceptable quality.

Mention was made in the introduction of the echo phenomenon which occurs in transmission systems and of the function performed by an echo suppressor in overcoming the problems introduced by such echoes. An echo suppressor is designed with a particular sensitivity so that signals on the receiving line, whether speech from the far end or echoes, must exceed a certain level before the suppressor is operated. For the purpose of illustration we may assume a sensitivity of −31 db for the echo suppressor shown in Fig. 1. We may assume further that an echo in transferring from the receiving line to the transmitting line is subjected to a loss of 7 db. If weak speech is being transmitted, and the loss-pad is shunted by the closed by-pass circuit, the apparent sensitivity of speech detector E as viewed from the receiving line is −34 db rather than its designed −41 db. Thus, it is possible for certain weak echoes on the receiving line, that is echoes between the levels of −31 db and −34 db, to come around the hybrid and operate the speech detector without operating the echo suppressor, simply because of the difference in sensitivity between the echo suppressor and the speech detector. Moreover, since the speech detector E is normally faster in operation than the echo suppressor, the leading edge of even a strong received signal may pass through the echo suppressor circuit and operate the speech detector before the echo suppressor has time to operate.

In accordance with the invention, speech detector F is employed to protect speech detector E against false operation by echoes by setting the sensitivity of speech detector F at a slightly higher level than the echo suppressor. For example, with an echo suppressor set at −31 db an appropriate level for speech detector F would be approximately −35 db. Accordingly, whenever echoes on the receiving line exceed −35 db, an output signal from speech detector F is applied to the control device which acts to open the loss-pad by-pass circuit, thereby effectively reducing the sensitivity of speech detector E.

Thus, in accordance with the invention, the sensitivity of the primary speech detector is automatically adjusted not only to accommodate the needs of both weak and strong talkers but also to reduce the sensitivity of the primary speech detector in the presence of echoes.

As described above, the output of speech detector E comprises direct-current pulses reflecting the degree of activity in the input speech spurts which occurs above the designed or modified sensitivity level of the detector. These output signals are applied by lead S1 to the TASI common control apparatus. A lead representing each additional speech detector output in the system is also shown connected to the TASI common control unit. TASI common control units are well known in the art and are shown, for example, in the F. A. Saal-I. Welber application cited above. In general, the function of a TASI common control unit is to scan each detector line periodically to determine the degree of output activity from each detector. Additionally, the common control includes a memory device which retains a current record of line-transmission channel connections. The common control output comprises one signal to identify a particular talker and a second signal to identify a particular channel.

Input points at the TASI switch also include a connection for each of the talker stations in the system. Output lines from the switch are transmission channels. While an approximate two-to-one ratio of talker stations to transmission channels is conventional, the number of each is normally substantially greater than shown in Fig. 1. In its operation, the TASI switch responds to the common control signals by connecting the appropriate talker line to an idle transmission channel.

Figure 2:
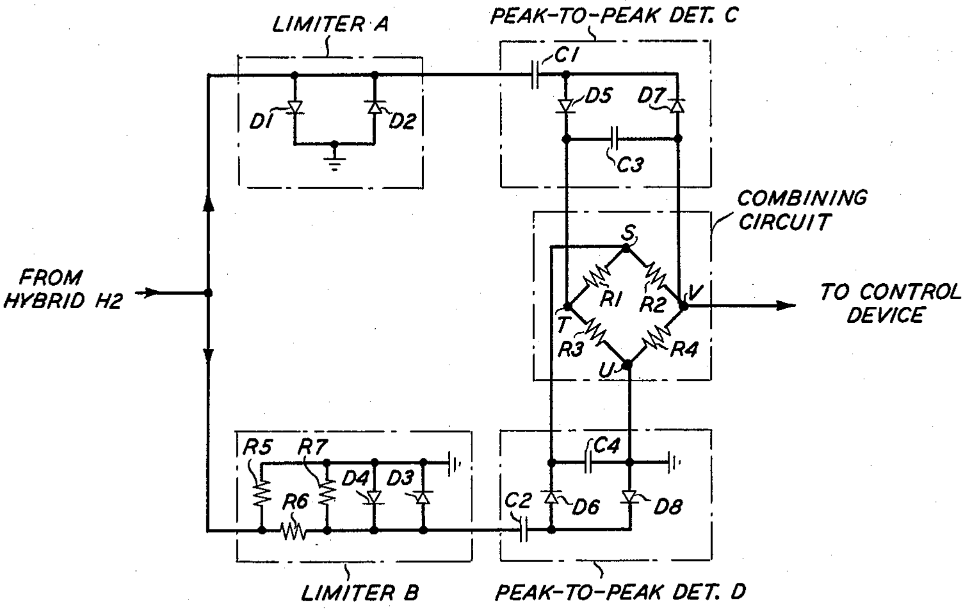
Fig. 2 is a schematic circuit diagram of a designated part of Fig. 1.
Figure 5:
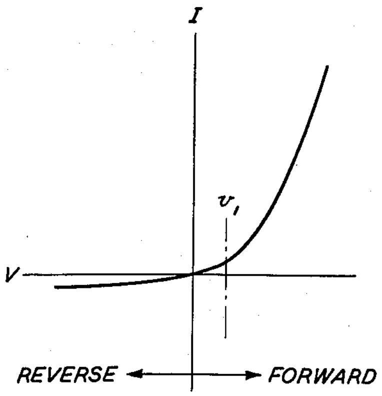
Fig. 5 is a characteristic operating curve of a particular diode.

Returning to the aspects of the invention relating to the limiters, the peak-to-peak detectors and the combining circuit, Fig. 2 presents a detailed schematic circuit diagram of the apparatus shown within the dotted line BX of Fig. 1. Details of the speech detectors are not presented since such devices are well known, being disclosed, for example, in Patent 2,258,966 to B. G. Bjornson issued October 14, 1941. As previously described, speech signals from hybrid H2 are applied to the parallel circuits including limiter A and limiter B, respectively. Limiter A comprises a pair of asymmetrically conducting impedance devices D1 and D2, which may be conventional diodes, for example, arranged in opposite conductivity directions with respect to ground. These diodes may advantageously be of silicon. The characteristics of such diodes are illustrated by the operating curve shown in Fig. 5. Such diodes exhibit relatively high impedance not only in the reverse direction but also in the forward direction up to some voltage $v_1$. In a particular device, the voltage $v_1$ might be one-half volt, for example. The employment of diodes of similar characteristics in limiter A provides a low impedance path through diode D1 to ground for positive voltage swings exceeding the $v_1$ value and a similar path through diode D2 for negative voltage swings exceeding $v_1$. Hence, for an input signal with voltage peaks exceeding the limiting levels of diodes D1 and D2, the output of limiter A is as shown by wave form A of Fig. 6. It will be apparent to persons skilled in the art that a desired predetermined relationship between the clipping level of the diodes and the level of speech signal input can be established by proper selection of the diode design characteristics and by the selection of an input amplifier and hybrid circuit with appropriate impedance. Thus, for example, the system may be so designed that a one-half volt clipping level corresponds to an input signal level of −30 db.

The diodes D3 and D4 of limiter B may be designed with a clipping level which differs by some predetermined level from diodes D1 and D2. In the particular embodiment of the invention shown in Fig. 2, however, diodes D3 and D4 are identical in characteristics to diodes D1 and D2 and the desired spread between the clipping level of limiter A and limiter B is simply and advantageously achieved by the insertion of a loss-pad between hybrid H2 and the input to the clipping circuit. The loss-pad shown comprises resistors R5, R6, and R7. If the designed loss in the pad is 10 db, for example, signals from hybrid H2 must exceed the −20 db level before clipping action is effected by limiter B. As a result, all signals above the −20 db level are clipped by limiter B, whereas all signals above the −30 db level are clipped by limiter A.

The peak-to-peak detector C comprises capacitors C1 and C3 and diodes D5 and D7. Peak-to-peak detector D is identical in circuit form and comprises capacitors C2 and C4 and diodes D6 and D8. These detectors function in a well-known manner to provide a direct-current output corresponding to a clipped or unclipped speech wave input from the limiting circuits. A substantially identical circuit is shown by Terman in a standard reference text, Electronic and Radio Engineering, McGraw-Hill, fourth edition, page 708. The significant feature of such detectors, which is advantageously employed in accordance with the invention, is that their maximum output is limited by the clipping level of the input signal. Accordingly, after an input signal has exceeded the clipping level of the limiter, additional signal strength results in no increase in the direct-current output of the peak-to-peak detector.

The output from peak-to-peak detector C is connected across arms TS and VS of the combining circuit, a conventional resistance-bridge network comprising resistors R1, R2, R3, and R4. The output of peak-to-peak detector D is similarly connected to points S and V. The two currents flow in opposite directions in resistor R4 and an output signal constituting the difference between the two is thus available between point V and ground. As discussed in detail above, the output of the combining circuit is applied to the control device.

Figure 6:
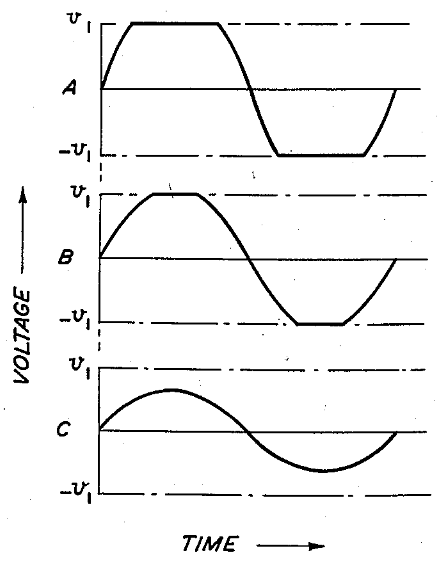
Fig. 6 is a family of speech-signal wave forms as affected by the action of the limiter-detector circuits.

Considering now the combined action of both limiters, both rectifiers, and the combining circuit in relation to input signals at specific levels, a relatively strong signal, −15 db for example, is clipped by limiter A to produce an output as shown by curve A of Fig. 6. The input signal level is reduced by 10 db by the loss-pad of limiter B but still exceeds the clipping level of limiter B and produces an output as shown by curve B of Fig. 6. Since both limiter outputs are clipped, the outputs of peak-to-peak detectors C and D are at a maximum and hence equal to each other. Equal inputs to the combining circuit cancel and no output signal is sent to the control device.

In the case of a signal from a weak talker, for example one at the −25 db level, limiter A produces a clipped output wave, illustrated by curve B of Fig. 6. The input signal is in effect reduced to a level of −35 db by the loss-pad of limiter B and since the limiters are designed to clip only signals exceeding −30 db, the output from limiter B is illustrated by curve C of Fig. 6. As a result, the output of detector C exceeds the output of detector D, and the difference is reflected in an output signal from the combining circuit, which signal is applied to the control device. As previously described in connection with the discussion of Fig. 1, operation of the control device serves to shunt the loss-pad so that the high level sensitivity of the speech detector is retained to accommodate the needs of the weak talker.

As in all systems employing echo suppressors and speech detectors, suitable provisions must be made in any embodiment of the features of the invention to provide for delay time and hangover time. The specific values for delay and hangover and the specific means employed necessarily depend on the particular circuit parameters. For example, a conventional integrating circuit may be employed to introduce a desired delay time between the combining circuit and the control device of Fig. 1. In a particular system, such delay would reduce still further the possibility of having the control device, and consequently the speech detector, operated by low level noise peaks.

To provide maximum service for weak talkers, the control device should remain operated for some substantial period after the termination of a signal from the combining circuit, that is to say, a relatively long hangover time should be introduced, as long as ten seconds, for example. This requirement can be met simply and advantageously, for example, by employing a control device comprising a slow release relay.

It is to be understood that the above-described arrangements are illustrative of the application of the principles of this invention. Numerous other arrangements may be designed by those skilled in the art without departing from the spirit and scope of the invention.

What is claimed is:

1. In a time assignment speech interpolation system, including a plurality of talkers' lines, a plurality of receiving lines, and a plurality of transmission channels, in combination, means responsive to speech signals on each of said talkers' lines for seizing one of said transmission channels, means for increasing the sensitivity of said channel seizing means, and means responsive to speech signals on each of said talkers' lines above a first preselected volume and below a second preselected volume for enabling said sensitivity increasing means.

2. Apparatus as defined in claim 1 including means responsive to signals on each of said receiving lines above a third preselected volume for disabling said enabling means.

3. Apparatus as defined in claim 2 wherein, for each of said talkers' lines, said channel seizing means includes a speech detector, wherein said sensitivity increasing means comprises a loss-pad and a low impedance path in parallel configuration connected between a respective one of said talkers' lines and said speech detector, wherein said disabling means comprises means for opening said low impedance path, and wherein said enabling means comprises means for closing said low impedance path.

4. Apparatus as defined in claim 3 and an echo suppressor across each talkers' line and receiving line pair responsive to signals on said receiving line above a fourth preselected volume, said fourth volume exceeding said third volume.

5. In a communication system including a plurality of signal sources, an equal plurality of receiving lines, and a lesser plurality of transmission channels, means associated with a corresponding one of each of said sources and with a corresponding one of said receiving lines responsive to signals from said source for connecting said source to one of said channels, means responsive to signals from said source within a preselected amplitude range for increasing the sensitivity of said connecting means, and means responsive to signals on said receiving line above a preselected amplitude for disabling said sensitivity increasing means.

6. Apparatus as defined in claim 5 wherein said connecting means comprises a first speech detector, means for applying signals from said source to said speech detector, means responsive to output signals from said speech detector for generating signals designating said signal source and one of said transmission channels, and means responsive to said designating signals for applying the signal from said signal source to said designated transmission channel.

7. Apparatus as defined in claim 6 wherein said sensitivity increasing means comprises means for applying signals from said source to a pair of parallel paths, the first of said paths comprising means for clipping said applied signals at the lowest amplitude of said preselected range, the second of said paths comprising means for clipping said applied signals at the highest amplitude of said range, means jointly responsive to a clipped signal on said first path and to an unclipped signal on said second path for generating an operating signal, and means responsive to said operating signal for increasing the sensitivity of said first speech detector.

8. Apparatus as defined in claim 7 wherein said first speech detector sensitivity increasing means comprises a loss-pad between said signal source and said first speech detector and means responsive to said operating signal for establishing a low impedance path in shunt with said loss-pad.

9. Apparatus as defined in claim 8 wherein said disabling means comprises a second speech detector and means responsive to the output of said second speech detector for opening said low impedance path.

10. In a two-way communication network including a source of speech signals, a transmitting channel, a receiving channel, a first speech detector at a first sensitivity and a second speech detector at a second sensitivity in combination, means connecting said signal source to said first speech detector through a loss-pad, means responsive to signals from said source within a preselected relatively low range of amplitudes for generating a control signal, means responsive to said control signal generating means for connecting a low impedance path in parallel with said loss-pad, means for applying signals on said receiving line to said second speech detector, means responsive to the output of said second speech detector for disabling said low impedance path connecting means, whereby the effective sensitivity of said first speech detector is relatively low in the absence of signals from said source, is relatively high for relatively weak talkers, and is relatively low for relatively strong talkers and echoes.

11. Apparatus as defined in claim 10 wherein said control signal generating means comprises a first conducting path including first means for clipping input speech signals at a first preselected level, means responsive to clipped output signals from said first clipping means for producing a direct current of a single preselected magnitude, a second conducting path, in parallel with said first path, including means for attenuating input speech signals, second means responsive to said attenuating means for clipping attenuated input speech signals at the second preselected level, means responsive to clipped output signals from said second clipping means for producing a direct current of said single preselected magnitude, and means responsive to a difference between the outputs of said direct-current producing means for applying a control signal to said low impedance path connecting means.

12. Apparatus as defined in claim 11 wherein said first clipping means comprises a first pair of asymmetrically conducting impedance devices in parallel configuration and in opposite polarity relation connected between said first path and a source of reference potential, and wherein said second clipping means comprises a second pair of asymmetrically conducting impedance devices with characteristics substantially identical to said first pair, in parallel configuration and in opposite polarity relation, connected between said second path and said source of reference potential.

13. A two-way communication system comprising a plurality of speech signal sources, each joined to a respective talker's line and to a respective receiving line, a lesser plurality of transmission channels, an equal plurality of means each responsive to speech spurts from a respective one of said speech signal sources for connecting the associated talker's line to one of said channels, each of said connecting means comprising means responsive to speech spurts within a preselected volume range for generating an operating signal, means with a first preselected sensitivity responsive to speech spurts for generating control signals, means responsive to said operating signal for increasing said first preselected sensitivity to a second preselected sensitivity, and switching means responsive to said control signals for applying said speech spurts to one of said channels.

14. Apparatus as defined in claim 13 including a plurality of echo suppressors, each with a preselected sensitivity, each connected across a respective talker's line and its associated receiving line, and a plurality of means, each with a preselected sensitivity exceeding the sensitivity of said echo suppressors, each responsive to signals on a respective receiving line for disabling a respective one of said sensitivity increasing means.

References Cited in the file of this patent

UNITED STATES PATENTS

| | | |
|---|---|---|
| 2,541,932 | Melhose | Feb. 13, 1951 |
| 2,694,142 | Laidig | Nov. 9, 1954 |
| 2,719,915 | Van Weel | Oct. 4, 1955 |
| 2,766,325 | Di Toro | Oct. 9, 1956 |